US006798627B2

(12) United States Patent
Schultz et al.

(10) Patent No.: US 6,798,627 B2
(45) Date of Patent: Sep. 28, 2004

(54) ENGINE GENERATOR SET SYSTEMS AND METHODS PROVIDING LOAD POWER FAULT PROTECTION

(75) Inventors: Mark H Schultz, Shoreview, MN (US); Jon Pehling, Stacy, MN (US)

(73) Assignee: Onan Corporation, Minneapolis, MN (US)

( * ) Notice: Subject to any disclaimer, the term of this patent is extended or adjusted under 35 U.S.C. 154(b) by 70 days.

(21) Appl. No.: 10/068,813

(22) Filed: Feb. 5, 2002

(65) Prior Publication Data

US 2003/0147186 A1 Aug. 7, 2003

(51) Int. Cl.[7] .............................................. H02H 7/00
(52) U.S. Cl. .................................. 361/20; 361/18
(58) Field of Search ............................ 361/18, 20, 21, 361/23, 29, 30, 31; 322/20–25

(56) References Cited

U.S. PATENT DOCUMENTS

| | | | | |
|---|---|---|---|---|
| 3,812,417 A | | 5/1974 | Keltz ........................... | 322/55 |
| 4,442,396 A | * | 4/1984 | Hucker ........................ | 322/21 |
| 4,459,489 A | | 7/1984 | Kirk et al. .................... | 290/13 |
| 4,477,765 A | | 10/1984 | Glennon et al. .............. | 322/20 |
| 4,498,016 A | | 2/1985 | Earleson et al. ............. | 290/40 |
| 4,786,822 A | | 11/1988 | Steely ......................... | 307/125 |
| 4,806,841 A | * | 2/1989 | Lee et al. ..................... | 322/29 |
| 4,855,664 A | * | 8/1989 | Lane ........................... | 322/19 |
| 4,905,134 A | * | 2/1990 | Recker et al. ................ | 363/98 |
| 5,006,781 A | | 4/1991 | Schultz et al. ............... | 322/25 |
| 5,055,765 A | * | 10/1991 | Rozman et al. .............. | 322/22 |
| 5,168,208 A | | 12/1992 | Schultz et al. ............... | 322/25 |
| 5,194,801 A | * | 3/1993 | Rozman ...................... | 322/25 |
| 5,225,973 A | * | 7/1993 | Patel et al. ................... | 363/43 |
| 5,239,255 A | | 8/1993 | Schanin et al. ............. | 323/237 |
| 5,285,147 A | * | 2/1994 | Rashid ........................ | 322/28 |
| 5,294,879 A | | 3/1994 | Freeman et al. ............. | 322/23 |
| 5,345,500 A | * | 9/1994 | Breeden et al. .............. | 361/56 |
| 5,355,075 A | * | 10/1994 | Wilson, III .................. | 322/25 |
| 5,369,353 A | | 11/1994 | Erdman ...................... | 323/207 |
| 5,390,068 A | | 2/1995 | Schultz et al. ................ | 361/95 |
| 5,418,675 A | * | 5/1995 | Bodenheimer et al. ....... | 361/20 |
| 5,438,502 A | * | 8/1995 | Rozman et al. .............. | 363/35 |
| 5,444,359 A | | 8/1995 | Riggio ........................ | 323/237 |
| 5,519,305 A | | 5/1996 | Nomura ...................... | 322/14 |
| 5,563,802 A | | 10/1996 | Plahn et al. ................. | 364/492 |
| 5,680,019 A | * | 10/1997 | Yang .......................... | 318/146 |
| 5,694,026 A | | 12/1997 | Blanchet ..................... | 322/29 |
| 5,701,070 A | | 12/1997 | Schultz ....................... | 322/37 |
| 5,715,124 A | | 2/1998 | Votava et al. ................ | 361/20 |
| 5,737,204 A | * | 4/1998 | Brown ........................ | 363/89 |
| 5,801,516 A | | 9/1998 | Rice et al. ................... | 322/37 |
| 5,805,394 A | | 9/1998 | Glennon ..................... | 361/20 |
| 6,081,123 A | * | 6/2000 | Kasbarian et al. .......... | 324/521 |
| 6,175,217 B1 | | 1/2001 | Da Ponte et al. ............ | 322/19 |
| 6,220,223 B1 | | 4/2001 | Weisman, II et al. ....... | 123/436 |
| 6,233,396 B1 | | 5/2001 | Kuwada et al. ............. | 388/811 |
| 6,347,028 B1 | * | 2/2002 | Hausman, Jr. et al. ..... | 361/93.1 |

OTHER PUBLICATIONS

"Recommended Specifications for Low Voltage Paralleling Equipment (Isolated Bus)", *Paralleling, Low Voltage, Advanced Master Control.doc*, pp. 1–12, (Mar. 29, 2001).

Schliffet, G., et al., "Emergency Electrical Power Systems Testing—Startup—Documentation", *Department of the Army. U.S. Army Corps of Engineers*, Electrical & Mechanical Conference Engineering Technology Transfer and Training Conference, pp. 1–19, (Jun. 2–4, 1998).

* cited by examiner

*Primary Examiner*—Brian Sircus
*Assistant Examiner*—Danny Nguyen
(74) *Attorney, Agent, or Firm*—Schwegman, Lundberg, Woessner & Kluth, P.A.

(57) ABSTRACT

An engine-generator set includes a load power fault protector circuit that detects when the power delivered to the load reaches a predetermined maximum power value, and substantially prevents the load power from exceeding the predetermined maximum value by decreasing the load voltage.

22 Claims, 2 Drawing Sheets

ENGINE GENERATOR SET SYSTEMS AND METHODS PROVIDING LOAD POWER FAULT PROTECTION

TECHNICAL FIELD

This document relates generally to providing electrical power from a fuel-powered generator and particularly, but not by way of limitation, to engine-generator set systems and methods providing load power fault protection.

BACKGROUND

Both businesses and households rely on electrical equipment powered from one-phase, two-phase, three-phase, or other suitable utility-provided alternating-current (AC) power sources. However, commercial power reliability may not suffice for certain applications, for example, for computer facilities, hospitals, banking systems, or industrial motor loads. Therefore, a backup—or even an independent—local power source may be desirable to provide a supplement to or substitute for a utility-provided AC power source.

One type of a local power source is a static system, which typically uses an inverter to generate the load's AC power from a direct current (DC) battery bank. Providing power from such a static system for an extended period of time, however, may require a large and costly bank of batteries. Another type of local power source is a rotary system, which typically uses a fuel-powered engine to rotate the shaft of an AC generator to produce an AC load current for an extended period of time. The engine, generator, and associated control mechanisms are sometimes referred to collectively as a "generator set" or "genset." Both the generator and the engine of a genset may be damaged by an excessive electrical load. Moreover, certain protection schemes may protect the AC generator, but not the engine, from damage. Gensets using engines powered by natural gas or liquid propane ("LP") gas are particularly susceptible to possible damage resulting from supplying an excessive electrical load. For these and other reasons, the present inventors have recognized a need for improved techniques of protecting genset components.

SUMMARY

This document describes, among other things, systems and methods providing load fault power protection to an engine-generator set. In one example, the engine-generator set includes a load power fault protector circuit that detects when the power delivered to the load reaches a predetermined maximum power value, and substantially prevents the load power from exceeding the predetermined maximum value by decreasing the load voltage.

Among other things, this document describes an example of an overload protection apparatus for protecting an engine-generator set from damage. The overload protection apparatus includes a load power sensing circuit and a voltage regulator circuit. The load power sensing circuit includes an input configured for coupling to an engine-generator set load, and an output providing a load power signal measuring an indication of power delivered from the engine-generator set to the load. The voltage regulator circuit includes an output configured for coupling to a control input of a generator exciter circuit to control a voltage delivered from a generator to the load. The voltage regulator circuit also includes an input coupled to the load power sensing circuit output to receive the measured load power indication. In this example, the voltage regulator is configured to decrease a magnitude of the voltage delivered from the engine-generator set to the load when the measured load power indication reaches a predetermined maximum value to substantially prevent the load power delivered from the engine-generator set to the load from exceeding a maximum load power value.

Among other things, this document also describes an example of an engine generator set including an engine, a generator, a load power sensing circuit, and a voltage regulator circuit. In this example, the generator is mechanically coupled to and driven by the engine, and includes an output configured to be coupled to a load for providing electrical power signal to the load. The generator includes a generator exciter circuit controlling a load voltage of the electrical power signal provided to the load using a signal received at a generator exciter circuit control input. The load power sensing circuit includes an input configured for coupling to the load and an output providing a load power signal measuring an indication of power delivered from the generator to the load. The voltage regulator circuit includes an output configured for coupling to the generator exciter circuit control input to control the load voltage. The voltage regulator circuit also includes an input coupled to the load power sensing circuit output to receive the measured load power indication. In this example, the voltage regulator circuit is configured to decrease a magnitude of the load voltage when the measured load power indication reaches a predetermined maximum value to substantially prevent the load power delivered from the engine-generator set to the load from exceeding a maximum load power value.

Among other things, this document also describes a method of generating AC electrical power and delivering the electrical power to a load. In one example, this includes sensing a load power delivered by an engine-generator set to a load, determining whether the delivered load power has reached a maximum load power value, and, if the delivered load power has reached a maximum load power value, then decreasing a load voltage to clamp the load power about the maximum load power value. Other examples will be apparent on reading the following detailed description and viewing the drawings that form a part thereof.

BRIEF DESCRIPTION OF THE DRAWINGS

In the drawings, which are offered by way of example, and not by way of limitation, and which are not necessarily drawn to scale, like numerals describe substantially similar components throughout the several views. Like numerals having different letter suffixes represent different instances of substantially similar components.

DETAILED DESCRIPTION

The following detailed description refers to the accompanying drawings which form a part hereof. These drawings show, by way of illustration, specific embodiments of practicing the invention. This document describes these embodiments in sufficient detail to enable those skilled in the art to practice the invention. One should understand that the embodiments may be combined, other embodiments may be utilized, or structural, logical and/or electrical changes may be made without departing from the scope of the present invention. The following detailed description is, therefore, not to be taken in a limiting sense, and the scope of the present invention is defined by the appended claims and their equivalents.

Figure 1:
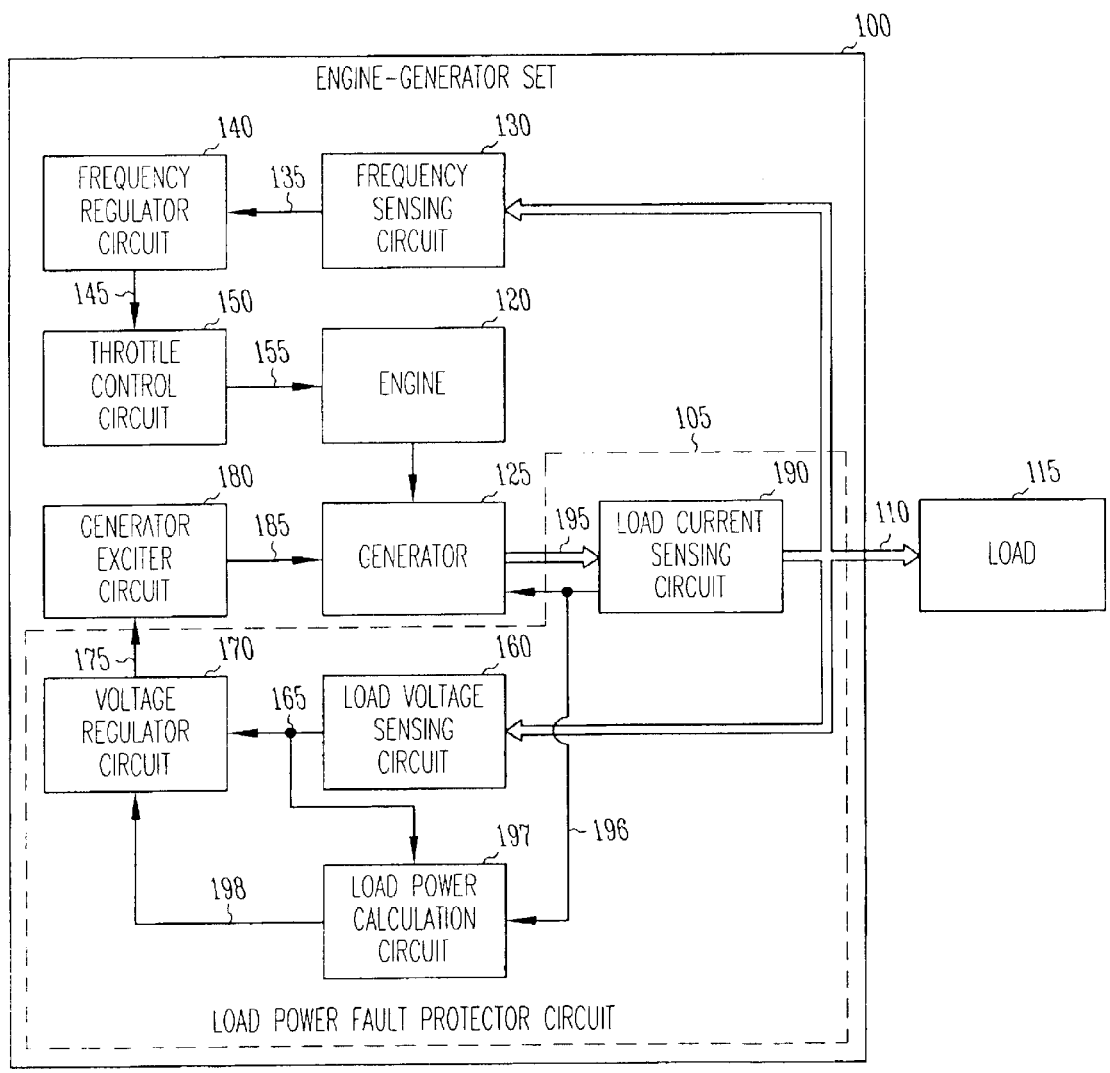
FIG. 1 is a schematic/block diagram illustrating generally, by way of example, but not by way of limitation, one example of portions of an engine-generator set ("genset") including a load power fault protector circuit.

FIG. 1 is a schematic/block diagram illustrating generally, by way of example, but not by way of limitation, one example of portions of an engine-generator set ("genset") 100 including a load power fault protector circuit 105. Genset 100 is coupled, at node/bus 110, to an electrical load 115 to which genset 100 provides electrical power. In this example, genset 100 includes an engine 120, which is mechanically coupled to drive an AC electrical generator 125. In one example, engine 120 is powered by a gaseous fuel source, such as propane or natural gas; such an engine 120 may be particularly vulnerable to damage caused when load 115 draws excessive electrical power. In other examples, engine 120 includes a gasoline engine, a diesel engine, a reciprocating internal combustion engine, a gas turbine, a steam turbine, a Sterling engine, a rotary engine, or any other engine capable of providing mechanical energy for driving generator 125. In this example, generator 125 provides a two-phase, three-phase, or other multiphase AC electrical power signal, at node/bus 110, to load 115.

In the example of FIG. 1, the frequency of the delivered AC electrical power depends on the speed of engine 120. In order to provide electrical power to load 115 at the desired frequency, the speed of engine 120 is controlled, such as by a frequency control feedback loop. In one such example, a frequency-sensing circuit 130 includes an input coupled to genset output node/bus 110 to sense the load signal frequency (or, in an alternate example, is coupled directly to engine 120 to sense its rotational frequency). Frequency sensing circuit 130 includes an output providing, at node/bus 135, a load frequency signal, indicative of load signal frequency, to frequency regulator circuit 140. Frequency regulator circuit 140 compares the load frequency signal at node/bus 135 to a reference frequency, and provides an output signal, at node/bus 145, to an input of throttle control circuit 150 to adjust the fuel provided at 155 to engine 120 to increase or decrease engine speed. Examples of suitable frequency control systems and methods are described in Schultz et al. U.S. Pat. No. 5,006,781 entitled "MICROPROCESSOR BASED INTEGRATED GENERATOR SET CONTROLLER APPARATUS AND METHOD," assigned to Onan Corp., which is incorporated herein by reference in its entirety, including its disclosures of genset frequency control.

In the example of FIG. 1, the magnitude of the line voltage delivered at genset output node/bus 110 to load 115 is also controlled, such as by a voltage control feedback loop. In one such example, a load voltage sensing circuit 160 includes an input coupled to genset output node/bus 110 to sense the magnitude of the load voltage signal. Load voltage sensing circuit 160 includes an output, at node/bus 165, that provides a load voltage signal, indicative of the load voltage signal magnitude, to an input of voltage regulator circuit 170. Voltage regulator circuit 170 compares the load voltage signal at node/bus 165 to a reference voltage, and provides an output signal, at node/bus 175, to an input of generator exciter circuit 180. In response, generator exciter circuit 180 adjusts, at node/bus 185, a winding excitation signal provided to generator 125, which, in response, adjusts the load voltage signal magnitude at output node/bus 110. Examples of suitable output voltage magnitude control systems and methods are described in Schultz et al. U.S. Pat. No. 5,006,781 entitled "MICROPROCESSOR BASED INTEGRATED GENERATOR SET CONTROLLER APPARATUS AND METHOD," assigned to Onan Corp., which is incorporated herein by reference in its entirety, including its disclosure of genset output voltage magnitude control.

The example of FIG. 1 also includes a load current sensing circuit 190, a portion of which is interposed between generator 125 and load 115 for sensing the amount of current delivered from generator 125 to load 115. Load current sensing circuit 190 includes an input, coupled at node/bus 195, for receiving a portion of the current being delivered to load 115 (or a scaled replicate thereof). In one example, load current sensing circuit 190 includes an output that provides to generator 125, at node/bus 196, a sensed load current signal, indicative of the load current delivered to load 115. In one example, generator 125 uses the sensed load current signal for controlling a circuit breaker, or other current control mechanism of generator 125, in the event of a short circuit or current overload. Examples of suitable output current circuit interrupter systems and methods are described in Schultz et al. U.S. Pat. No. 5,006,781 entitled "MICROPROCESSOR BASED INTEGRATED GENERATOR SET CONTROLLER APPARATUS AND METHOD," and Schultz U.S. Pat. No. 5,701,070 entitled "ELECTRICAL GENERATOR DAMAGE PROTECTION APPARATUS AND METHOD WITH CIRCUIT BREAKER TRIP INITIATION," each of which is assigned to Onan Corp., and each of which is incorporated herein by reference in its entirety, including their disclosure of genset output current interruption and control.

The example of FIG. 1 also includes a load power fault protector circuit 105. In one example, load power fault protector circuit 105 protects generator 125 and engine 120 when load 115 attempts to draw excessive power from genset 110, such as by activating a load power control feedback loop when the load power reaches a predetermined maximum load power value. In the example of FIG. 1, load power fault protector circuit includes a load power calculation circuit 197 including an input, coupled at node/bus 165, to the load voltage sensing circuit 160 to receive the load voltage signal. Another input of load power calculation circuit 197 is coupled, at node/bus 196, to load current sensing circuit 196 to receive the load current signal. By multiplying the received load voltage and load current signals (including multiplication by a power factor calculated from a cosine of the phase angle between the load voltage and load current signals) load power calculation circuit calculates the real power being delivered to load 115. Load power calculation circuit 197 includes an output that provides to a control input of voltage regulator circuit 170, at node/bus 198, a load power signal indicative of the power being delivered to load 115. In one example, when the load power signal at node/bus 198 indicates that the power delivered to load 115 has reached the predetermined maximum load power value, the voltage regulator circuit 170 operates to control generator exciter circuit 180 and generator 185 so as to reduce the magnitude of the load voltage at the genset output node/bus 110. This substantially prevents the load power provided by genset 110 from exceeding the predetermined maximum load power value, and protects generator 125 and engine 120 from damage resulting from providing excessive load power. Because such clamping of load power about the predetermined maximum load power value uses a feedback control loop, the transient load power may exceed the predetermined maximum load power value for a short period of time, depending on, among other things, the loop gain, stability, load characteristics, etc., however, the feedback control loop operates to reduce such an excess transient load power toward zero in the steady-state.

Figure 2:
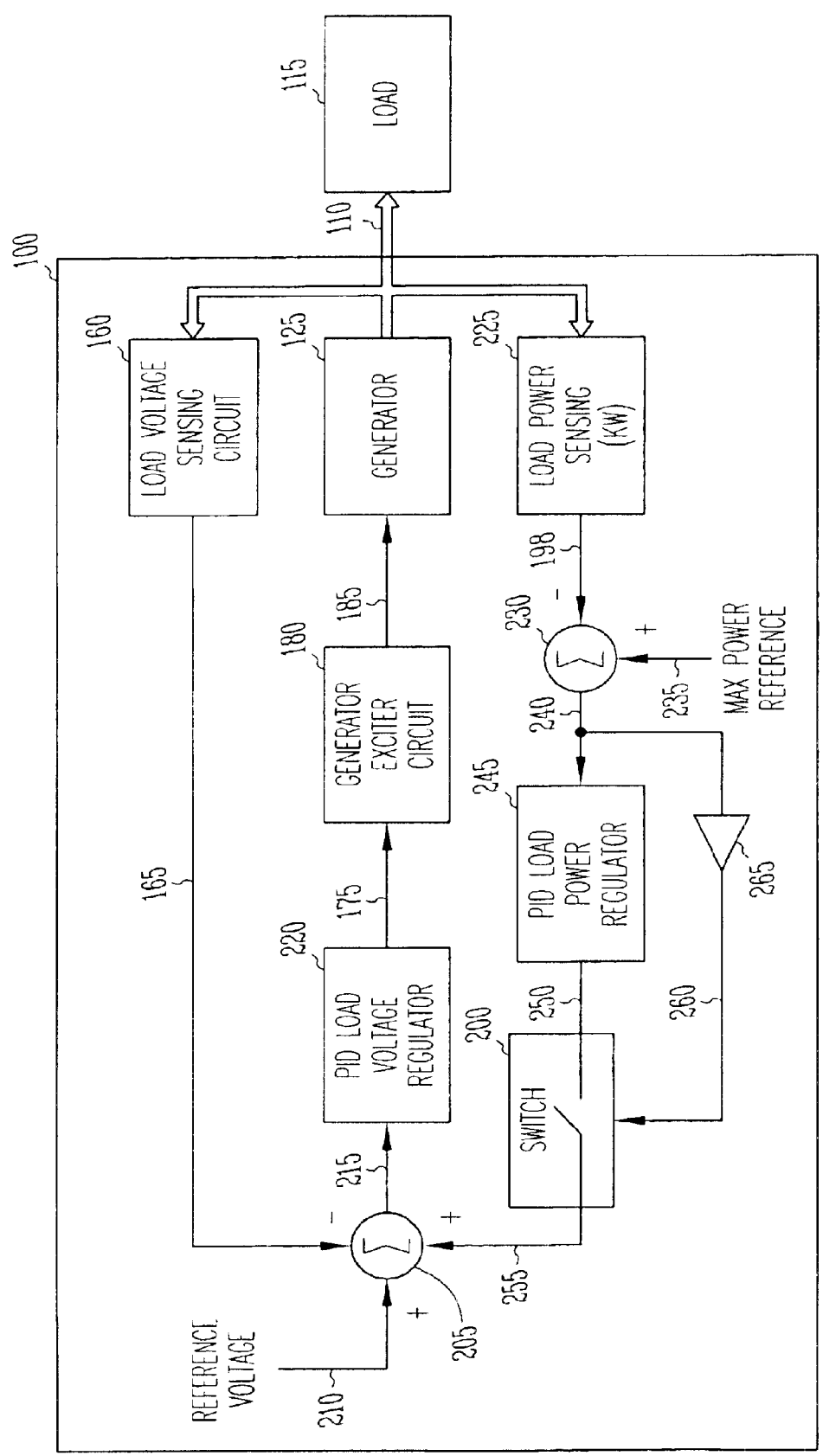
FIG. 2 is a schematic/block diagram illustrating generally, by way of example, but not by way of limitation, one conceptualization of portions of engine-generator set that illustrates how, during overload load power conditions, the load power control feedback loop interacts with the load voltage control feedback loop to decrease the load voltage to substantially prevent the load power from exceeding a predetermined maximum load power value.

FIG. 2 is a schematic/block diagram illustrating generally, by way of example, but not by way of limitation, one conceptualization of portions of engine-generator set 100 that illustrates how, during overload load power conditions, the load power control feedback loop interacts with the load voltage control feedback loop to decrease the load voltage to substantially prevent the load power from exceeding a predetermined maximum load power value. The load power control feedback loop includes switch 200, which is open when the load power is less than a predetermined maximum load power value. Under such conditions, the load voltage at node/bus 110 is determined by the load voltage control feedback loop.

The load voltage control feedback loop includes load voltage sensing circuit 160, which includes an input coupled to the load 115 at genset output node/bus 110. Load voltage sensing circuit 160 provides at node/bus 165 a load voltage signal indicative of the load voltage at node 110 to a negative input of an amplifier circuit or other summing (or difference) circuit 205. A positive input of summing circuit 205 receives, at node/bus 210, from a reference voltage circuit a substantially stable or constant reference voltage to which the load voltage signal at node/bus 165 is compared. Summing circuit 205 includes an output that provides, at node/bus 215, an "error" signal based on the difference between the load voltage signal at node/bus 165 and the reference voltage signal at node/bus 210. In this example, the error signal at node/bus 215 is received at an input of a proportional, integral, derivative ("PID") or other load voltage regulator circuit 220. One example of a PID regulator is described in the above-incorporated Schultz et al. U.S. Pat. No. 5,006,781. Load voltage regulator 220 includes an output that provides, at node/bus 175, a control voltage to generator exciter circuit 180, for adjusting the winding excitation of generator 125, and in turn, regulating the load voltage at node/bus 110 to the desired value.

In the example of FIG. 2, the load power control feedback loop includes load power sensing circuit 225, which includes an input coupled to the load 115 at genset output node/bus 110. Load power sensing circuit 225 (which, in one example, includes load voltage sensing circuit 160, load current sensing circuit 190, and load power calculation circuit 197) provides, at node/bus 198, a load power signal indicative of the power delivered from genset 100 to load 115. The load power signal at node/bus 198 is received at a negative input of an amplifier circuit or other summing (or difference) circuit 230. A positive input of summing circuit 230 receives, at node/bus 235, from a power reference circuit a substantially stable or constant reference power value that establishes a maximum load power value. Summing circuit 230 includes an output that provides, at node/bus 240, an "error" signal based on the difference between the load power signal at node/bus 198 and the reference power value at node/bus 235. The error signal at node/bus 240 is received at an input of a PID or other load power regulator circuit 245. Load power regulator 245 includes an output that provides, at node/bus 250, a control voltage that, in one example, is delivered when switch 250 is closed to a positive input, at node/bus 255, of summing circuit 205. This adjusts (e.g., decreases) the load voltage to substantially prevent the load power from exceeding the maximum load power value. Switch 250 is closed when the load power reaches the maximum load power value. Switch 250 is open when the load power is less than the maximum load power value to inhibit the load power control feedback loop during such conditions. In one example, switch 250 is controlled by coupling the error signal at node 240 to a control input of the switch, at node/bus 260, through an amplifier, sign-circuit, comparator, or other resolving circuit 265 that resolves the error signal into appropriate signal levels for controlling switch 250. The switch control configuration of FIG. 2 is merely one example implementation. In an alternative example, the signal controlling switch 200 is generated using the load power signal at node 198, which is compared to a separate reference power that may differ in value from the reference power at node 235. In one embodiment, this comparison is made using a hysteresis comparator so that switch 200 closes when the load power at node/bus 255 exceeds an incremental value above the maximum load power value (e.g., an upper hysteresis point of 110% of maximum load power) and opens when the load power at node/bus 255 falls below an incremental value below the maximum load power value (e.g., a lower hysteresis point at 90% of maximum load power). In a further embodiment using such hysteresis, regulator 245 constrains the voltage at node 255 to be zero or negative, to ensure that the load voltage signal is not increased during the time when switch 200 remains closed as the load power is falling below 100% but remains above the lower hysteresis point.

In one example, the load voltage and load power control feedback loops are implemented using analog circuit components. In another example, however, portions of one or both of these loops are implemented digitally or in software, such as by an appropriate sequence of instructions executed on a microprocessor, controller, state-machine, or similar configuration. Moreover, FIG. 2 merely illustrates one example of interaction between load voltage and load power control feedback loops. For example, in an alternative embodiment, the error signal at node 255 is not provided to a positive input of summing circuit 205, but is instead used to control a gain or otherwise scale the reference voltage at node/bus 210 when the load power reaches the predetermined maximum power value.

In another example, the load power fault protector circuit 105 described herein with respect to FIGS. 1 and 2, is implemented in combination with other load control systems and techniques used by genset 110. In one example, genset 110 also includes current control circuits, such as described in the above-incorporated Schultz et al. U.S. Pat. No. 5,006,781 and Schultz et al. U.S. Pat. No. 5,701,070. In another example, genset 110 also includes a circuit for decreasing the load voltage as a function of a drop in frequency, as may occur temporarily when a substantial additional load is switched in. One suitable example of such a circuit and associated operative techniques is described in Schultz et al. U.S. Pat. No. 5,006,781, entitled "MICROPROCESSOR BASED INTEGRATED GENERATOR SET CONTROLLER APPARATUS AND METHOD," assigned to Onan Corporation, which is incorporated herein by reference in its entirety, including its disclosure of devices and methods for decreasing load voltage as a function of generator frequency.

It is to be understood that the above description is intended to be illustrative, and not restrictive. For example, the above-discussed embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects.

What is claimed is:

1. An overload protection apparatus for protecting an engine-generator set from damage, the overload protection apparatus including:

a load vower sensing circuit, including an input configured for coupling to an engine-generator set load, and an output providing a load power signal measuring an indication of power delivered from the engine-generator set to the load; and a voltaae regulator circuit, including an output configured for coupling to a control input of a generator exciter circuit to control a voltage delivered from a generator to the load, and including an input coupled to the load power sensing circuit output to receive the measured load power indication, the voltage regulator configured to decrease a magnitude of the voltage delivered from the engine-generator set to the load when the measured load power indication reaches a predetermined maximum value to substantially prevent the load power delivered from the engine-generator set to the load from exceeding a maximum load power value; and in which the load power sensing circuit includes:

a load voltage sensing circuit, including an input configured to be coupled to the load, and an output providing a load voltage signal indicative of a load voltage;

a load current sensing circuit, including an input configured to be coupled to the load, and an output providing a load current signal indicative of the load current; and a load power calculation circuit, including a first input coupled to the load voltage sensing circuit output to receive the load voltage signal, and a second input coupled to the load current sensing circuit output to receive the load current signal, and coupled to the load power sensing circuit output to provide the load power signal based on a multiplication of the load voltage signal and the load current signal and a power factor calculated using a phase angle between the load voltage signal and the load current signal.

2. An overload protection apparatus for protecting an engine-generator set from damage, the overload protection apparatus including:

a load vower sensing circuit, including an input configured for coupling to an engine-generator set load, and an output providing a load power signal measuring an indication of power delivered from the engine-generator set to the load; and a voltaae regulator circuit, including an output configured for coupling to a control input of a generator exciter circuit to control a voltage delivered from a generator to the load, and including an input coupled to the load power sensing circuit output to receive the measured load power indication, the voltage regulator configured to decrease a magnitude of the voltage delivered from the engine-generator set to the load when the measured load power indication reaches a predetermined maximum value to substantially prevent the load power delivered from the engine-generator set to the load from exceeding a maximum load power value; and further including a load voltage sensing circuit, including an input configured to be coupled to the load, and an output providing a load voltage signal indicative of a load voltage, and in which the voltage regulator circuit includes:

a voltage reference circuit, including an output providing a reference voltage; and a first difference circuit, including a first input coupled to the output of the voltage reference circuit to receive the reference voltage, a second input coupled to the output of the voltage sensing circuit to receive the load voltage signal, and a third input coupled to the output of the load power sensing circuit to receive a signal based on the load power signal, the first difference circuit also including an output providing a first difference signal indicative of a difference between the load voltage signal and a sum of the reference voltage and the signal based on the load power signal.

3. The apparatus of claim 2, which the voltage regulator further includes a first PID regulator, the first PID regulator including an input coupled to the output of the first difference circuit to receive the first difference signal, the first PID regulator including an output coupled to the control input of the generator exciter circuit to control the voltage delivered from the generator to the load.

4. The apparatus of claim 2, further including:

a power reference circuit, including an output providing a reference power; and a second difference circuit, including a first input coupled to the output of the power reference circuit to receive the reference power, a second input coupled to the output of the load power sensing circuit to receive the load power signal, the second difference circuit also including an output providing a second difference signal indicative of a difference between the reference power and the load power signal.

5. The apparatus of claim 4, further including a second PID regulator, the second PID regulator including an input coupled to the output of the second difference circuit to receive the second difference signal, the second PID regulator including an output coupled by a switch to the third input of the first difference circuit.

6. The apparatus of claim 5, in which the switch is configured to conduct only when the load power signal indicates that the load power equals or exceeds the maximum load power value.

7. The apparatus of claim 5, in which the switch is configured to close when the load power exceeds a predetermined upper hysteresis point that incrementally exceeds the maximum load power value, and in which the switch is configured to open when the load power falls below a predetermined lower hysteresis point that is incrementally less than the maximum load power value.

8. The apparatus of claim 7, in which the second PID regulator includes a clamping circuit that outputs a negative voltage to the third input of the first difference circuit when the load power falls below the maximum load power value but exceeds the predetermined lower hysteresis point.

9. An overload protection apparatus for protecting an engine-generator set from damage, the overload protection apparatus including:

a load vower sensing circuit, including an input configured for coupling to an engine-generator set load, and an output providing a load power signal measuring an indication of power delivered from the engine-generator set to the load; and a voltage regulator circuit, including an output configured for coupling to a control input of a generator exciter circuit to control a voltage delivered from a generator to the load, and including an input coupled to the load power sensing circuit output to receive the measured load power indication, the voltage regulator configured to decrease a magnitude of the voltage delivered from the engine-generator set to the load when the measured load power indication reaches a predetermined maximum value to substantially prevent the load power delivered from the engine-generator set to the load from exceeding a maximum load power value; and in which the voltage regulator circuit includes:

a load voltage sensing circuit, including an input configured to be coupled to the load, and an output providing a load voltage signal indicative of a load voltage; and a voltage reference circuit, including an input coupled to the load power sensing circuit output, and an output providing a reference voltage, in which the reference voltage is substantially constant when the measured load power indication is below the predetermined maximum value, and in which the reference voltage varies when the measured load power indication reaches or exceeds the predetermined maximum value.

10. An engine generator set including:

an engine;

a generator, mechanically coupled to and driven by the engine, the generator including an output configured to be coupled to a load for providing electrical power signal to the load, the generator including a generator exciter circuit controlling a load voltage of the electrical power signal provided to the load using a signal received at a generator exciter circuit control input;

a load power sensing circuit, including an input configured for coupling to the load, and an output providing a load power signal measuring an indication of power delivered from the generator to the load; and a voltage regulator circuit, including an output configured for coupling to the generator exciter circuit control input to control the load voltage, and including an input coupled to the load power sensing circuit output to receive the measured load power indication, the voltaae regulator circuit configured to decrease a magnitude of the load voltage when the measured load power indication reaches a predetermined maximum value to substantially prevent the load power delivered from the engine-generator set to the load from exceeding a maximum load power value; and in which the load power sensing circuit includes:

a load voltage sensing circuit, including an input configured to be coupled to the load, and an output providing a load voltage signal indicative of the load voltage;

a load current sensing circuit, including an input configured to be coupled to the load, and an output providing a load current signal indicative of the load current; and a load power calculation circuit, including a first input coupled to the load voltage sensing circuit output to receive the load voltage signal, and a second input coupled to the load current sensing circuit output to receive the load current signal, and coupled to the load power sensing circuit output to provide the load power signal based on a multiplication of the load voltage signal and the load current signal and a power factor calculated using a phase angle between the load voltage signal and the load current signal.

11. An engine generator set including:

an engine;

a generator, mechanically coupled to and driven by the engine, the generator including an output configured to be coupled to a load for providing electrical power signal to the load, the generator including a generator exciter circuit controlling a load voltage of the electrical power signal provided to the load using a signal received at a generator exciter circuit control input;

a load power sensing circuit, including an input configured for coupling to the load, and an output providing a load power signal measuring an indication of power delivered from the generator to the load; and a voltage regulator circuit, including an output configured for coupling to the generator exciter circuit control input to control the load voltage, and including an input coupled to the load power sensing circuit output to receive the measured load power indication, the voltage regulator circuit configured to decrease a magnitude of the load voltage when the measured load power indication reaches a predetermined maximum value to substantially prevent the load power delivered from the engine-generator set to the load from exceeding a maximum load power value; and further including a load voltage sensing circuit, including an input configured to be coupled to the load, and an output providing a load voltage signal indicative of the load voltage, and in which the voltage regulator circuit includes:

a voltage reference circuit, including an output providing a reference voltage; and a first difference circuit, including a first input coupled to the output of the voltage reference circuit to receive the reference voltage, a second input coupled to the output of the voltage sensing circuit to receive the load voltage signal, and a third input coupled to the output of the load power sensing circuit to receive a signal based on the load power signal, the first difference circuit also including an output providing a first difference signal indicative of a difference between the load voltage signal and a sum of the reference voltage and the signal based on the load power signal.

12. The apparatus of claim 11, in which the voltage regulator further includes a first PID regulator, the first PID regulator including an input coupled to the output of the first difference circuit to receive the first difference signal, the first PID regulator including an output coupled to the control input of the generator exciter circuit to control the voltage delivered from the generator to the load.

13. The apparatus of claim 11, further including:

a power reference circuit, including an output providing a reference power; and a second difference circuit, including a first input coupled to the output of the power reference circuit to receive the reference power, a second input coupled to the output of the load power sensing circuit to receive the load power signal, the second difference circuit also including an output providing a second difference signal indicative of a difference between the reference power and the load power signal.

14. The apparatus of claim further including a second PID regulator, the second PID regulator including an input coupled to the output of the second difference circuit to receive the second difference signal, the second PID regulator including an output coupled by a switch to the third input of the first difference circuit, the switch configured to conduct only when the load power signal indicates that the load power equals or exceeds the maximum load power value.

15. An engine generator set including:

an engine;

a generator, mechanically coupled to and driven by the engine, the generator including an output configured to be coupled to a load for providing electrical power signal to the load, the generator including a generator exciter circuit controlling a load voltage of the electrical power signal provided to the load using a signal received at a generator exciter circuit control input;

a load power sensing circuit, including an input configured for coupling to the load, and an output providing a load power signal measuring an indication of power delivered from the generator to the load; and a voltage regulator circuit, including an output configured for coupling to the generator exciter circuit control input to control the load voltage, and including an input coupled to the load power sensing circuit output to receive the measured load power indication, the voltage regulator circuit configured to decrease a magnitude of the load voltage when the measured load power indication reaches a predetermined maximum value to substantially prevent the load power delivered from the engine-generator set to the load from exceeding a maximum load power value; and in which the voltage regulator circuit includes:

a load voltage sensing circuit, including an input configured to be coupled to the load, and an output providing a load voltage signal indicative of a load voltage; and a voltage reference circuit, including an input coupled to the load power sensing circuit output, and an output providing a reference voltage, in which the reference voltage is substantially constant when the measured load power indication is below the predetermined maximum value, and in which the reference voltage varies when the measured load power indication reaches or exceeds the predetermined maximum value.

16. A method of generating AC electrical power and delivering the electrical power to a load, the method including:

sensing a load power delivered by an engine-generator set to a load; determining whether the delivered load power has reached a maximum load power value in which determining whether the delivered load power has reached a maximum load power value includes:

comparing the load power to a reference power value; and computing a difference between the load power and the reference power value;

if the delivered load power has reached a maximum load power value, then decreasing a load voltage to clamp the load power about the maximum load power value; and computing a PID control signal using the difference between the load power and the reference power value.

17. The method of claim 16, further including switching in a load power control feedback loop when the load power exceeds the reference power value.

18. The method of claim 16, in which decreasing the load voltage to clamp the load power includes controlling a generator excitation voltage.

19. The method of claim 16, further including:

using a load voltage feedback control loop to control the load voltage about a substantially constant value when the load power is below the maximum load power value; and using a load power feedback control loop to substantially prevent the load power from exceeding the maximum load power value, including coupling into the load voltage feedback control loop to reduce the load voltage when the load power reaches the maximum load power value.

20. The method of claim 16, further including:

using a load voltage feedback control loop to control the load voltage about a substantially constant value when the load power is below the maximum load power value; and using a load power feedback control loop to substantially prevent the load power from exceeding the maximum load power value, including activating the load power feedback control loop to reduce the load voltage when the load power reaches the maximum load power value.

21. The method of claim 19, further including generating a PID control signal based on a difference between the load voltage signal and a sum of the reference voltage and a signal based on a difference between a reference power and the load power.

22. The method of claim 19, which activating the load power feedback control loop includes switchably coupling the load power feedback control loop into the load voltage feedback control loop.

* * * * *